(12) United States Patent
Zatloukal et al.

(10) Patent No.: US 7,496,905 B2
(45) Date of Patent: *Feb. 24, 2009

(54) SYSTEM AND METHOD FOR GENERATING STATE MACHINES

(75) Inventors: Kevin Zatloukal, Cambridge, MA (US); John McEnerney, Austin, TX (US)

(73) Assignee: BEA Systems, Inc., San Jose, CA (US)

( * ) Notice: Subject to any disclaimer, the term of this patent is extended or adjusted under 35 U.S.C. 154(b) by 563 days.

This patent is subject to a terminal disclaimer.

(21) Appl. No.: 10/893,423

(22) Filed: Jul. 16, 2004

(65) Prior Publication Data

US 2005/0015757 A1   Jan. 20, 2005

Related U.S. Application Data

(60) Provisional application No. 60/488,161, filed on Jul. 18, 2003.

(51) Int. Cl.
*G06F 9/45* (2006.01)
*G06F 9/44* (2006.01)

(52) U.S. Cl. ...................... 717/143; 712/236
(58) Field of Classification Search ............... 717/136, 717/143
See application file for complete search history.

(56) References Cited

U.S. PATENT DOCUMENTS

| | | | | |
|---|---|---|---|---|
| 5,339,420 A | * | 8/1994 | Hoxey | 717/151 |
| 5,995,963 A | | 11/1999 | Nanba et al. | 707/6 |
| 6,272,641 B1 | * | 8/2001 | Ji | 726/24 |
| 6,301,703 B1 | | 10/2001 | Shank et al. | 717/109 |
| 6,327,704 B1 | * | 12/2001 | Mattson et al. | 717/153 |
| 6,775,763 B2 | * | 8/2004 | Sexton et al. | 712/227 |
| 6,993,706 B2 | | 1/2006 | Cook | 719/315 |
| 7,062,728 B2 | | 6/2006 | Tojima | 716/3 |

OTHER PUBLICATIONS

Algorithm in Java, Jul. 2002, Addison Wesley Professional, 3rd Ed. Section 5.2, Chapter 15, 36 pages.
J. Shirazi, "Java Performance Tuning", 2000, O'Reilly, 1st Ed. pp. 189-195.

* cited by examiner

*Primary Examiner*—Tuan Q Dam
*Assistant Examiner*—Marina Lee
(74) *Attorney, Agent, or Firm*—Womble Carlyle Sandridge & Rice, PLLC

(57) ABSTRACT

The present invention generates state machines that can be used in a scanner and/or a parser for software program compilation. The state machines are not table-driven, but rather are encoded directly by creating jumps and branches in bytecodes, which are machine-independent codes generated by a Java compiler and can be executed on any Java-enabled device. Such state machines can be much faster than those based on tables, and much smaller in code size than those implemented in executable codes. In addition, such state machines can be optimized to reduce the number of states and the amount of codes required to encode each state in it. This can allow these state machines to meet strict code size restrictions specified by certain virtual machines, such as the Java virtual machine.

33 Claims, 6 Drawing Sheets

SYSTEM AND METHOD FOR GENERATING STATE MACHINES

CLAIM OF PRIORITY

This application claims priority from the following application, which is hereby incorporated by reference in its entirety:

U.S. Provisional Application No. 60/488,161, entitled SYSTEM AND METHOD FOR GENERATING STATE MACHINES by Kevin Zatloukal and John MeEnerney, filed Jul. 18, 2003.

CROSS-REFERENCE TO RELATED APPLICATIONS

This application is related to the following co-pending applications which are each hereby incorporated by reference in their entirety:

U.S. patent application Ser. No. 10/893,401, entitled SYSTEM AND METHOD FOR GENERATING MULTI-WAY BRANCHES by: Kevin Zatloukal, filed Jul. 16, 2004.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of generating and deploying state machines for software compilation.

BACKGROUND

A state machine typically comprises a set of states, each of which can process a stream of input, produce a stream of output, and then switch to the next state. State machines are widely used in software program compilation, where most lexical scanners and grammar parsers utilize some sort of a state machine to perform their work. For example, scanners can use a simple state machine in order to perform a lexical analysis of a regular language, while parsers can use a state machine augmented with a stack to perform a grammatical analysis of the language. The implementation of these state machines can be important in determining the running time efficiency and memory consumption of a parser or scanner.

State machines are frequently implemented using table-driven methods. A next state in a state machine can be determined by indexing a table with the current state and other information. Optimizations can be performed to make the tables smaller, but these optimizations may result in slower performance caused by other issues. In order to optimize the performance of state machines, other methods must be used. One way to speed up the execution of a state machine is to implement it directly in executable codes, instead of encoding the state transitions in a table. Each state can be represented by a label or a jump target in a program and the state transition can be determined by using a switch statement based on the value of an expression or similar multi-way branch construction. These state machines can be much faster than table-driven state machines, but the executable codes for the state machines can also become very large and difficult to download or deploy efficiently.

Java is a platform-independent programming languages from Sun Microsystems, Inc..

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Embodiments of the present invention generate state machines implemented in bytecodes for applications such as software program compilation. Here, bytecodes can be machine-independent codes generated by a Java compiler and can be executed on any Java-enabled device. The state machines are not table-driven, but rather are encoded directly by creating jumps and branches in bytecodes. Such state machines can be much faster than those based on tables, and much smaller in code size than those implemented in executable codes. In addition, such state machines can be optimized to reduce the number of states and the amount of codes required to encode each state in it. This can allow these state machines to meet strict code size restrictions specified by certain virtual machines, such as the Java virtual machine, which does not allow an inlined function (i.e., the codes implementing the function are not in a separate routine) to have more than 64K of bytecodes.

Figure 1:
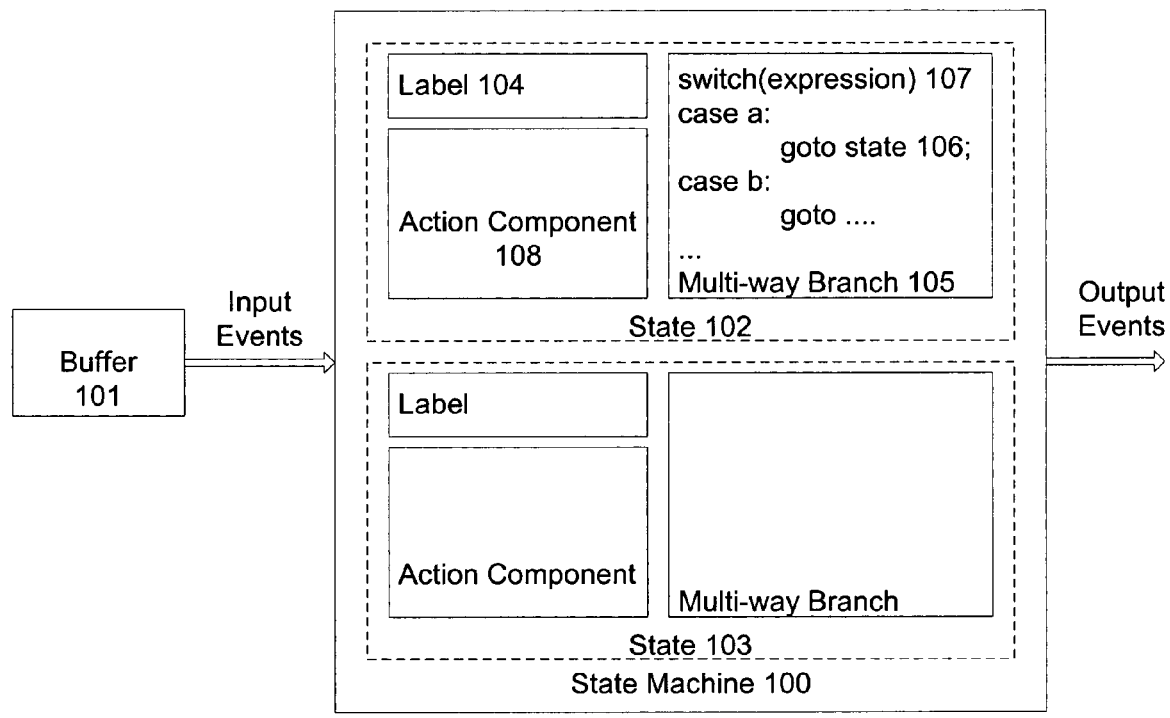
FIG. 1 is an illustration of an exemplary state machine in accordance with one embodiment of the present invention.

FIG. 1 is an illustration of a state machine 100 in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, the state machine can accept a stream of input events, which can be stored in and read from a buffer 101. The state machine may contain one or more states 102 and 103 to process the input events and output a stream of output events. Here, the events may include, but are not limited to, characters, tokens, symbols, data structures, and other suitable events. A state can include a label or some other type of jump target 104 to identify itself. In addition, the state can include a multi-way branch 105 in order to determine the next state 106 the current state is going to jump to. The multi-way branch can use the value of an expression 107 to switch to the next state based on information such as, the next event in the input stream, the next event in the output stream, the entry on the top of a stack associated with the state machine, or the contents of any other data structure. Here, the expression can include one or more logical and/or arithmetic operations.

Figure 2:
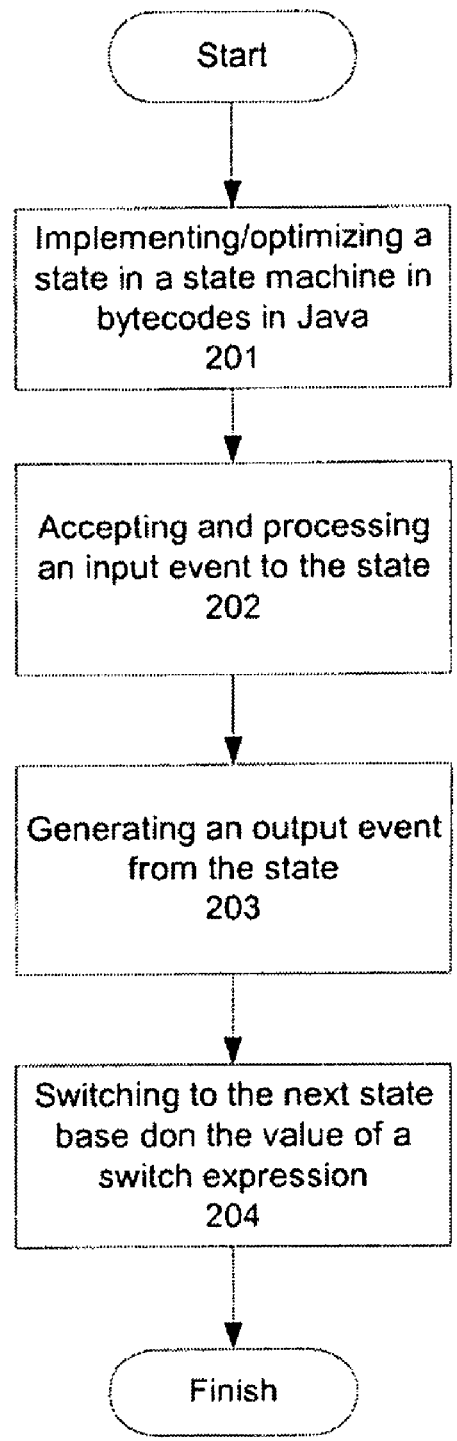
FIG. 2 is a flow chart illustrating an exemplary operating process of a state in the state machine in accordance with one embodiment of the invention.

FIG. 2 is a flow chart illustrating an exemplary operating process of a state in the state machine in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, each state in the state machine can be implemented and/or optimized using bytecodes in Java at step 201. The state may accept and/or process an input event in an input stream at step 202, and generate an output event in an output stream at step 203. The current state may also switch to the next state in the state machine at step 204 based on the value of an expression, which may take multiple inputs to generate its expression as explained below.

In one embodiment, an action component 108 can be associated with each state. This action component can be invoked when the state is reached. Codes for these actions can be placed directly into the state machine or can be included at a different location. In one embodiment, two different segments of the codes can be generated. In object-oriented languages, these two different segments may be two different classes. The first segment can encode the state machine itself, and can be emitted directly as bytecodes. The second segment can encode any user-defined actions and a useful interface to the state machine. This segment may be emitted as source codes and compiled by a compiler, or it can also be emitted directly as bytecodes.

In another embodiment, the input characters to the state machine may be read and stored completely into memory before processing begins. This implementation avoids the need to read each input character in a file stored in persistent storage, and improves the runtime efficiency of the state machine.

In another embodiment, the end-of-file character may be inserted directly into the stream of input characters to improve runtime efficiency. Normally, a special check is performed by the state machine every time a character is retrieved to determine if the end of the file has been reached. This check results in an extra if-statement for every character that is read. As an alternative, the end-of-file character can be placed directly into the stream of input characters and one state can be augmented in the state machine to deal with it. In one embodiment, an error state can be augmented to deal with the end-of-file character and perform the appropriate action when the end of the file is reached.

For the downloading and deployment efficiency of the state machine, it is often important to optimize the size of the bytecodes used to implement the state machine. In one embodiment, combining or eliminating certain states in the machine can reduce the size of the bytecodes required to implement the state machine. For instance, in a scanner, there may be many states associated with the regular expressions for a keyword of a language. The state machine can be simplified by only having a simple rule that can recognize an identifier and then determine if the identifier is in fact the keyword. This way, all states associating with the same regular expressions can be combined and share the same implementation.

In one embodiment, the bytecodes can be customized to consider the inlining behavior of the state machine to improve runtime performance. For instance, in an embodiment that generates Java bytecodes, the behavior of the Java virtual machine should be considered. A function is usually not inlined unless the size of bytecodes implementing it is very short. As a result, frequently called functions that are large may not be inlined and may cause a performance penalty. In some circumstances, such a function may consist of an if-statement, with a large amount of codes that is executed if the if-statement is true. If the if-statement is often false, performance can be improved by replacing the body of an if-statement with a single function call. This will result in the shortening of the bytecodes implementing the function containing the if-statement, allowing inlining to occur. Since the if-statement is rarely true, the function representing the body of the if-statement will be only called infrequently, and the penalty on the performance of the state machine is minimal.

In another embodiment, the size of the bytecodes can be reduced if the bytecodes can be reorganized by adopting instructions with the same functionality as others but having smaller sizes. For example, there are two types of variable access instructions in Java, IREAD and IREADN. The first type is used to access any variable by index and is two bytes long. The second type is only one byte long, where N may range from zero to three and the instruction specifically reads one of the first four variables. Algorithms may be used to optimize the assignment of variables implementing the state machine so that the most frequently used variables are placed at indices zero through three and can be accessed by a single instruction such as IREADN instead of IREAD.

Some embodiments of the present invention may use a special algorithm to implement the multi-way branch that meets specified optimality requirements on the size of the bytecodes. The bytecodes so implemented can be more compact and run faster than those generated un-optimized. Such an algorithm can be implemented using a target array, where the indices of the array represent the value of the switch expression of the branch and the entries of the array represent the target locations of the next state. The target array does not literally need to be represented as an array, it can be stored in some other form if it is too sparse to be stored literally as an array.

The algorithm for obtaining an optimal implementation of the multi-way branch can be conceptually divided into three phases: first, it constructs a set of subarrays that form a disjoint covering for the target array; second, it determines an optimal branch implementation for each subarray; and third, it determines the optimal branch implementation for each union of one or more adjacent subarrays, culminating in the optimal implementation for the entire target array.

Figure 3:
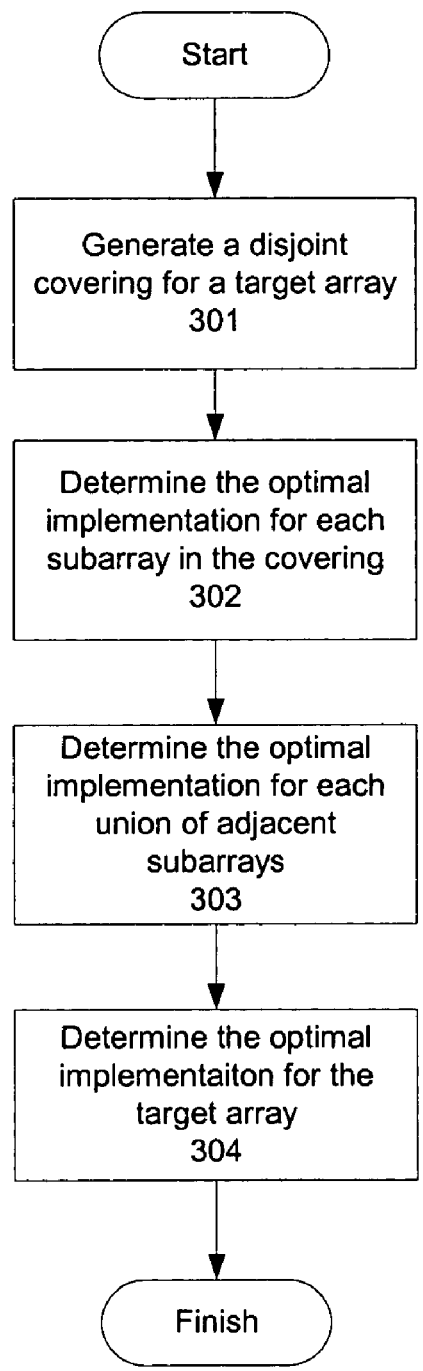
FIG. 3 is a flow chart illustrating an exemplary multi-way branch generation algorithm in accordance with one embodiment of the invention.

FIG. 3 is a flow chart illustrating an exemplary multi-way branch generation algorithm in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 3, the first step 301 involves constructing a disjoint covering for the target array. A disjoint covering can be constructed by partitioning the target array into one or more disjoint subarrays. There are many possible coverings that may be used. One possible covering creates a subarray for every element in the target array.

Another possible covering can be generated by finding subarrays that are as long as possible while still maintaining the property that the entire target values for every index are the same. The intervening regions that do not have this property can make up the rest of the covering. This covering can be generated by searching for a subarray containing equal values beginning at the start of the target array. A threshold can be included, such as 5; subarrays of equal values shorter than this value will be discarded. When such a subarray is found, it is added to the covering, along with any non-equal subset that preceded it. When the end of the target array is reached, add any remaining non-equal subarray to the final set.

The second step 302 involves determining an optimal branch implementation for each subarray in the covering. There may be many branch implementations available. One possible implementation is a "goto" statement. This implementation can be used for subarrays that contain only one value. Another possible branch implementation is a table, which can be accessed by a single look-up operation. A third possible branch implementation can be a list, where a linear or binary search can be used to locate the proper target.

There are many possible optimality criteria that can be used. In some embodiments, the optimality criterion is a cost function of the form c (space, time)=a*space+b*time, where space and time represent the running time of the implementation and the space required for the implementation of the implementation, respectively. In one embodiment, b might be chosen to be 4 and a might be chosen to be 1.

Figure 4:
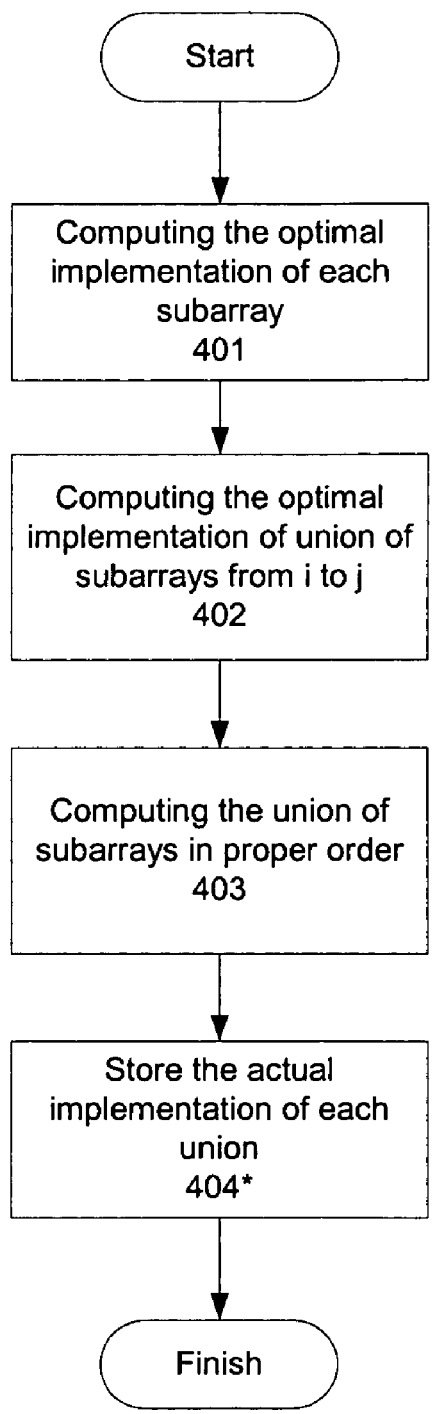
FIG. 4 is an exemplary flow chart illustrating a dynamic programming algorithm used to determine the optimal implementation for the union of adjacent subarrays in accordance with one embodiment of the invention.

FIG. 4 is an exemplary flow chart illustrating a dynamic programming algorithm used to determine the optimal implementation for the union of adjacent subarrays at step 303 in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

In one embodiment, the dynamic programming algorithm can utilize a table T, where the value T[i, j] is the cost of the optimal implementation of the union of all subarrays between the i-th and the j-th. In an embodiment employing a, the cost for the i-th subarray is stored in a table, T[i, i]. At step 401, the optimal implementation for an individual subarray is chosen by computing the cost function of each possible implementation and choosing the minimum cost implementation. This process can be performed for each subarray in the covering.

In one embodiment, the algorithm can determine T[i, j] at step 402 by choosing the minimum of: 1) the minimum cost implementation for the union of the i-th through the j-th subarray; and 2) the cost of a combination of the best implementation for the union of the i-th through the k-th subarray and the best implementation for the k+1-th through the j-th subarray. In one embodiment, the combination is generated by using an if-statement that uses the index of the requested target to determine whether to use the best implementation for the union of the i-th through the k-th subarrays or the best implementation for the union of the k+1-th through the j-th subarrays.

In one embodiment, the table T can be filled in a proper order at step 403. This order can be achieved by incrementing j from 0 to N−1, where N is the total number of subarrays, and for each value of j, decrementing i from j−1 to 0. Using this order, the table entries required to compute any particular entry would already be filled in when that entry is reached. When the algorithm completes, the table T will contain the lowest costs for each possible implementation. The actual implementation for each entry in T can be stored in an auxiliary data structure at an optional step 404. Using this method, the last table entry that will be filled in at step 304 is T[0, N−1], which corresponds to the cost of the best branch implementation for the union of all the subarrays in the covering, or the entire target array.

In one embodiment, branch implementations can be shared between multiple states. When a shared branch implementation is found, the duplicate code can be removed from all of the states but one and replaced with a "goto" statement.

One embodiment can use a state machine to implement a scanner for program compilation, which is capable of performing lexical analysis of a programming language to recognize regular expressions in a stream of characters in a program. The embodiment can use any of the above-mentioned space optimizations in order to produce a scanner that uses a small number of states and encodes those states using a small size of bytecodes.

Figure 5:
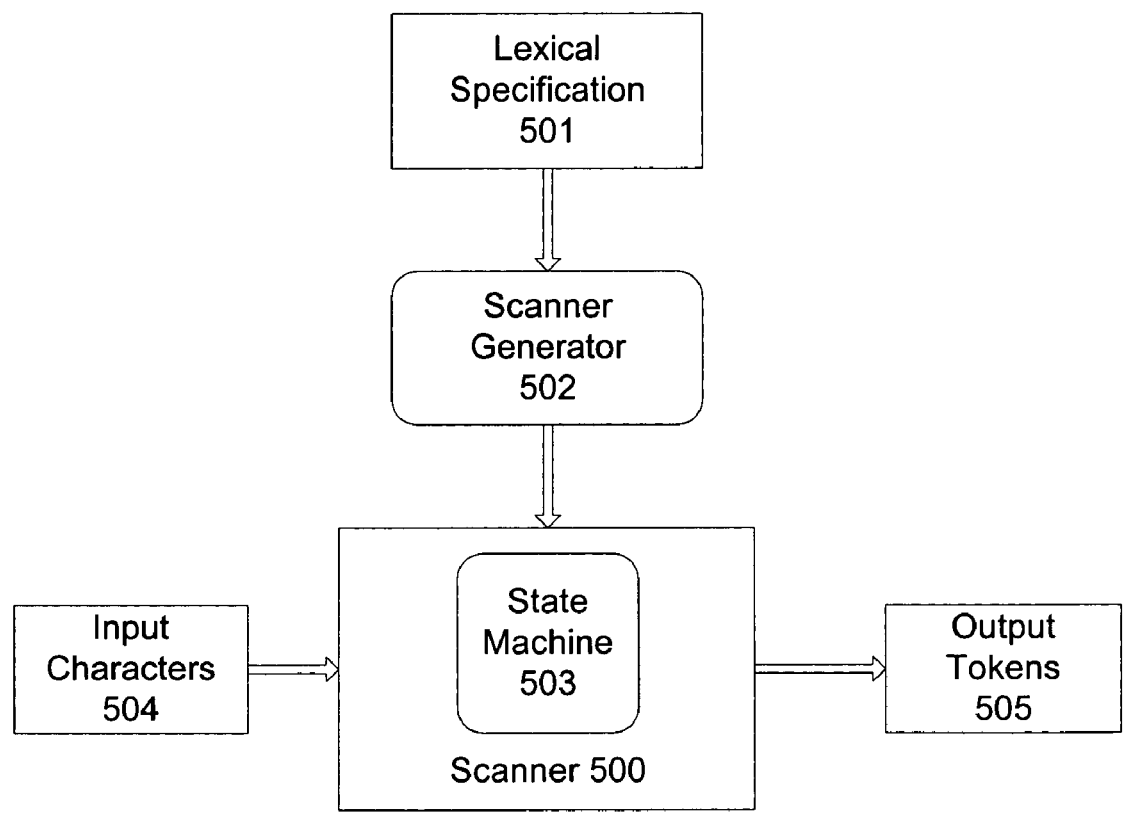
FIG. 5 is an illustration of an exemplary scanner using a state machine in accordance with one embodiment of the present invention.

FIG. 5 is an illustration of an embodiment using a state machine to implement a scanner 500. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 5, a scanner generator 502 takes as its input a lexical specification 501 representing a lexical structure of a language, and generates a state machine 503 capable of performing lexical analysis of the language according to the teachings of this disclosure. The scanner 500 takes a stream of input characters 504 from a program as its input and utilizes the state machine to recognize the regular expressions inside a program and output a stream of tokens 505.

In embodiments that use state machines to implement scanners, the function used to read the next input character can be a good candidate for the inlining optimization to reduce the size of bytecodes used to implement the state machine. In scanners, this function can be run in every state. This function may contain lengthy code that is only executed in rare circumstances. For instance, if the input characters are stored in an input buffer, the code to resize the buffer will only need to be called when the buffer runs out of space. If the resizing code is placed in a separate function, the check for a full buffer can be inlined, while the code to resize the buffer will not. In the common case where the input buffer is not full, the function call to resize the buffer can be avoided while the function call to get the next character can be eliminated.

One embodiment can use a state machine to implement a parser to perform grammatical analysis of a programming language during compilation. The state machine can be generated by a parser generator to represent the possible sequence of grammatical syntax that can be used to recognize a language. The embodiment can use any of the above-mentioned space optimizations in order to produce a parser that uses a small number of states and encodes those states using a small size of bytecodes.

Figure 6:
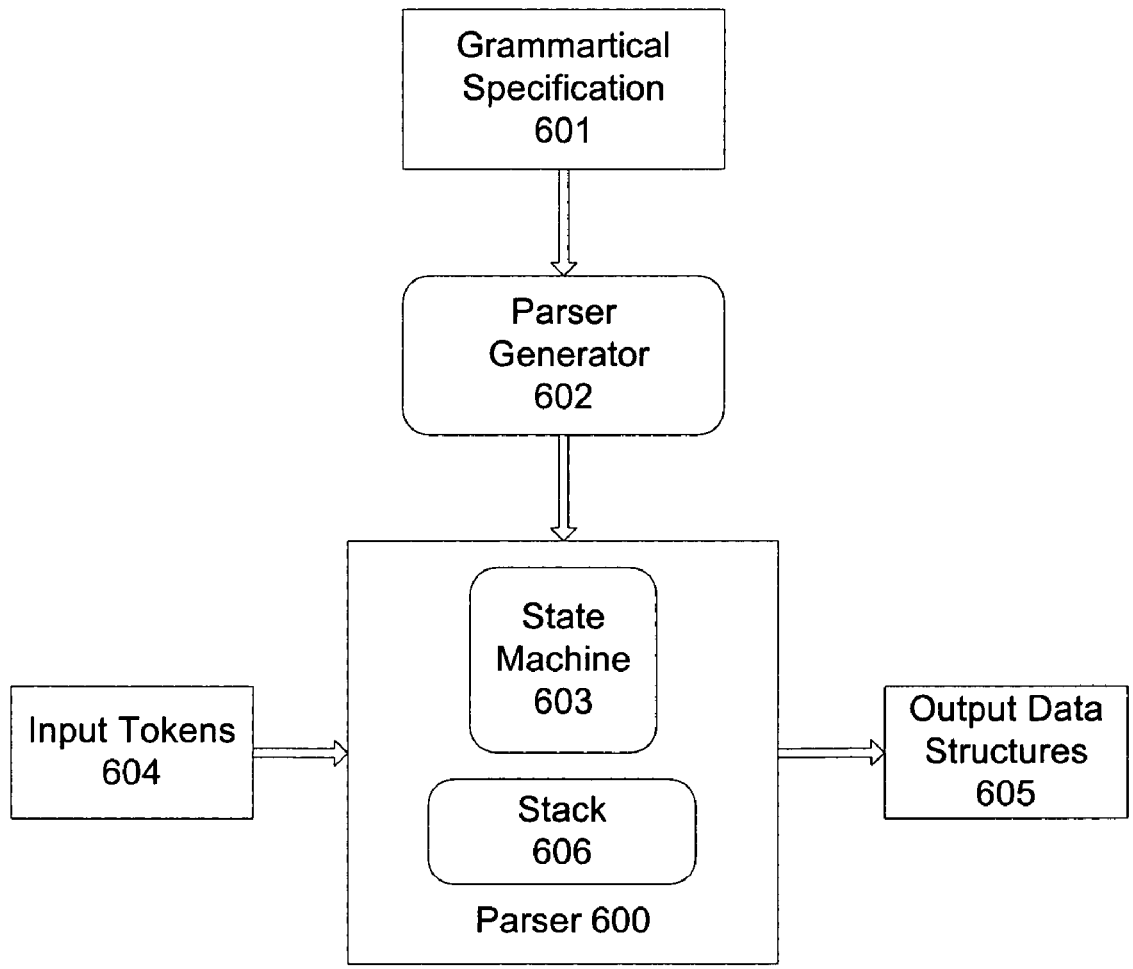
FIG. 6 is an illustration of an exemplary parser using a state machine in accordance with one embodiment of the present invention.

FIG. 6 is an illustration of an embodiment using a state machine to implement a parser 600. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 6, a parser generator 602 takes as its input a grammatical specification 601 representing the grammatical syntax of a programming language, and generates a state machine 603 capable of performing grammatical analysis of the language according to the teachings of this disclosure. The parser 600 takes a stream of tokens 604 as its input and utilizes the state machine to recognize the language and generate a stream of data structures 605 from the tokens of the program. A stack 606 can be augmented to the state machine to store the stream of input tokens during the parsing process.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "function" is used in the embodiments of the systems and methods described above, it will be evident that such concept can be interchangeably used with equivalent concepts such as, method, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A computer-enabled system to provide a state machine for software program compilation, comprising:
   a microprocessor,
   a plurality of input events to one or more states in the state machine;
   a plurality of output events from the one or more states in the state machine;
   said one or more states, wherein a state in the one or more states is implemented in machine-independent bytecodes and is capable of:
      accepting and processing an input event in the plurality of input events;
      generating an output event in the plurality of output events; and
      switching to another state in the one or more states in the state machine,
   wherein the state in the one or more states has a multi-way branch that is capable of determining a next state to jump to from the state based on a value of a switch expression of a switch statement that is associated with the state, wherein the multi-way branch is implemented directly in byte code using a target array,
   wherein the indices of the target array represent the value of the switch expression of the multi-way branch and the entries of the target array represent the target locations of the next state.

2. The system according to claim 1, wherein:
an event in the plurality of input and/or output events can be one of a character, a token, a symbol, and a data structure.

3. The system according to claim 1, wherein:
the size of the bytecodes implementing a function in the state can be limited to be no more than a maximum size limit.

4. The system according to claim 1, wherein:
the plurality of input events can be stored in memory before they are processed.

5. The system according to claim 1, wherein:
the bytecodes used to implement the state can be optimized for size and/or runtime performance using at least one of:
   adopting an inline function;
   adopting a smaller bytecodes-size instruction having the same functionality as a larger bytecodes-size instruction; and
   including an end-of-file character in the plurality of input characters.

6. The system according to claim 1, wherein:
the switch expression is capable of determining the next state using at least one of: an input event in the plurality of input events, an output event in the plurality of output events.

7. The system according to claim 1, wherein:
the state can be eliminated and/or combined with another state in the one or more states to optimize the size of the bytecodes.

8. The system according to claim 1, wherein:
the state comprises at least one of:
   a type of jump target capable of associating with and identifying the state; and
   an action component that can be invoked when the state is reached.

9. The system according to claim 8, wherein:
the type of jump target can be a label.

10. The system according to claim 8, wherein:
the action component can be implemented in codes located either inside the state machine or at a different location.

11. A computer-enabled system to support a scanner to perform lexical analysis of a programming language, comprising:
a microprocessor,
a plurality of characters input to the scanner;
a lexical specification of the language;
a plurality of tokens output from the scanner; and
a state machine with one or more states implemented in machine-independent bytecodes and is capable of:
representing the lexical specification of the language using the one or more states;
accepting and processing the plurality of characters; and
generating the plurality of tokens,
wherein the state in the one or more states has a multi-way branch that is capable of determining a next state to jump to from the state based on a value of a switch expression of a switch statement that is associated with the state, wherein the multi-way branch is implemented directly in byte code using a target array,
wherein the indices of the target array represent the value of the switch expression of the multi-way branch and the entries of the target array represent the target locations of the next state.

12. A computer-enabled system to support a parser to perform grammatical analysis of a language, comprising:
a microprocessor,
a plurality of tokens input to the parser;
a grammatical specification of the language;
a plurality of data structures output from the parser; and
a state machine with one or more states implemented in machine-independent bytecodes and is capable of:
representing the grammatical specification of the language using the one or more states;
accepting and processing the plurality of tokens; and
generating the plurality of data structures,
wherein the state in the one or more states has a multi-way branch that is capable of determining a next state to jump to from the state based on a value of a switch expression of a switch statement that is associated with the state, wherein the multi-way branch is implemented directly in byte code using a target array,
wherein the indices of the target array represent the value of the switch expression of the branch multi-way and the entries of the target array represent the target locations of the next state.

13. A computer-enabled method to provide a state machine for software program compilation, comprising:
accepting a plurality of input events to one or more states in the state machine;
implementing a state in the one or more states in machine-independent bytecodes,
wherein the state is capable of:
processing an input event in the plurality of input events;
generating an output event in a plurality of output events; and
switching to another state in the one or more states based on a value of a switch expression,
wherein the state in the one or more states has a multi-way branch that is capable of determining the next state to jump to from the state based on the value of the switch expression of a switch statement that is associated with the state, wherein the multi-way branch is implemented directly in byte code using a target array,
wherein the indices of the target array represent the value of the switch expression of the multi-way branch and the entries of the target array represent the target locations of the next state.

14. The method according to claim 13, further comprising:
limiting the size of the bytecodes used to implement a function in the state to be no more than a maximum size limit.

15. The method according to claim 13, further comprising:
storing the plurality of input events in memory before processing them.

16. The method according to claim 13, further comprising:
optimizing the bytecodes used to implement the state for code size reduction and/or runtime performance using at least one of:
adopting an inline function;
adopting a smaller bytecodes-size instruction having the same functionality as a larger bytecodes-size instruction; and
including an end-of-file character in the plurality of input characters.

17. The method according to claim 13, further comprising:
determining the next state via the switch expression using at least one of: an input event in the plurality of input events, an output event in the plurality of output events.

18. The method according to claim 13, further comprising:
eliminating and/or combining the state with another state in the one or more states to optimize the size of the bytecodes.

19. The method according to claim 13, further comprising:
associating with and identifying the state via a type of jump target;
invoking an action component when the state is reached; and
determining the next state to jump to from the state based on the value of the switch expression using a multi-way branch.

20. The method according to claim 19, further comprising:
implementing the action component in codes located either inside the state machine or at a different location.

21. A computer-enabled method to support a scanner to perform lexical analysis of a programming language, comprising:
accepting a plurality of characters to the scanner;
accepting a lexical specification of the language; and
implementing a state machine with one or more states in machine-independent bytecodes, wherein the state machine is capable of:
representing the lexical specification of the language using the one or more states;
processing the plurality of characters; and
generating a plurality of tokens output from the scanner,
wherein a state in the one or more states has a multi-way branch that is capable of determining a next state to jump to from the state based on a value of a switch expression of a switch statement that is associated with the state, wherein the multi-way branch is implemented directly in byte code using a target array,
wherein the indices of the target array represent the value of the switch expression of the multi-way branch and the entries of the target array represent the target locations of the next state.

22. A computer-enabled method to support a parser to perform grammatical analysis of a language, comprising:
   accepting a plurality of tokens to the parser;
   accepting a grammatical specification of the language;
   implementing a state machine with one or more states in machine-independent bytecodes, wherein the state machine is capable of:
      representing the grammatical specification of the language using the one or more states;
      processing the plurality of tokens; and
      generating a plurality of data structures output from the parser,
   wherein a state in the one or more states has a multi-way branch that is capable of determining a next state to jump to from the state based on a value of a switch expression of a switch statement that is associated with the state, wherein the multi-way branch is implemented directly in byte code using a target array,
   wherein the indices of the target array represent the value of the switch expression of the multi-way branch and the entries of the target array represent the target locations of the next state.

23. A computer readable medium having instructions stored thereon that when executed by a processor cause a system to:
   accept a plurality of input events to one or more states in a state machine;
   implement a state in the one or more states in machine-independent bytecodes,
   wherein the state is capable of:
      processing an input event in the plurality of input events;
      generating an output event in a plurality of output events; and
      switching to another state in the one or more states based on a value of a switch expression,
   wherein a state in the one or more states has a multi-way branch that is capable of determining a next state to jump to from the state based on the value of the switch expression of a switch statement that is associated with the state, wherein the multi-way branch is implemented directly in byte code using a target array,
   wherein the indices of the target array represent the value of the switch expression of the multi-way branch and the entries of the target array represent the target locations of the next state.

24. The machine readable medium of claim 23, further comprising instructions that when executed cause the system to:
   limit the size of the bytecodes used to implement a function in the state to be no more than a maximum size limit.

25. The machine readable medium of claim 23, further comprising instructions that when executed cause the system to:
   store the plurality of input events in memory before processing them.

26. The machine readable medium of claim 23, further comprising instructions that when executed cause the system to:
   optimize the bytecodes used to implement the state for code size reduction and/or runtime performance using at least one of:
      adopting an inline function;
      adopting a smaller bytecodes-size instruction having the same functionality as a larger bytecodes-size instruction; and
      including an end-of-file character in the plurality of input characters.

27. The machine readable medium of claim 23, further comprising instructions that when executed cause the system to:
   determine the next state via the switch expression of the multi-way branch using at least one of: an input event in the plurality of input events, an output event in the plurality of output events.

28. The machine readable medium of claim 23, further comprising instructions that when executed cause the system to:
   eliminate and/or combine the state with another state in the one or more states to optimize the size of the bytecodes.

29. The machine readable medium of claim 23, further comprising instructions that when executed cause the system to:
   associate with and identify the state via a type of jump target;
   invoke an action component when the state is reached; and
   determine the next state to jump to from the state based on the value of the switch expression using a multi-way branch.

30. The machine readable medium of claim 29, further comprising instructions that when executed cause the system to:
   implement the action component in codes located either inside the state machine or at a different location.

31. A computer readable medium having instructions stored thereon that when executed by a processor cause a system to:
   accept a plurality of characters to a scanner;
   accept a lexical specification of a language; and
   implement a state machine with one or more states in machine-independent bytecodes, wherein the state machine is capable of:
      representing the lexical specification of the language using the one or more states;
      processing the plurality of characters; and
      generating a plurality of tokens output from the scanner,
   wherein a state in the one or more states has a multi-way branch that is capable of determining a next state to jump to from the state based on a value of a switch expression of a switch statement that is associated with the state, wherein the multi-way branch is implemented directly in byte code using a target array,
   wherein the indices of the target array represent the value of the switch expression of the multi-way branch and the entries of the target array represent the target locations of the next state.

32. A computer readable medium having instructions stored thereon that when executed by a processor cause a system to:
   accept a plurality of tokens to a parser;
   accept a grammatical specification of a language;
   implement a state machine with one or more states in machine-independent bytecodes, wherein the state machine is capable of:
      representing the grammatical specification of the language using the one or more states;
      processing the plurality of tokens; and
      generating a plurality of data structures output from the parser,
   wherein a state in the one or more states has a multi-way branch that is capable of determining a next state to jump to from the state based on a value of a switch expression of a switch statement that is associated with the state, wherein the multi-way branch is implemented directly in byte code using a target array, wherein the indices of the target array represent the value of the switch expression of the multi-way branch and the entries of the target array represent the target locations of the next state.

33. A computer-enabled system to provide a state machine for software program compilation, comprising:

a microprocessor, means for accepting a plurality of input events to one or more states in the state machine;

means for implementing a state in the one or more states in machine-independent bytecodes, wherein the state is capable of:

processing an input event in the plurality of input events;

generating an output event in a plurality of output events; and switching to another state in the one or more states based on a value of a switch expression, wherein the state in the one or more states has a multi-way branch that is capable of determining a next state to jump to from the state based on the value of the switch expression of a switch statement that is associated with the state, wherein the multi-way branch is implemented directly in byte code using a target array, wherein the indices of the target array represent the value of the switch expression of the multi-way branch and the entries of the target array represent the target locations of the next state.

\* \* \* \* \*

UNITED STATES PATENT AND TRADEMARK OFFICE
CERTIFICATE OF CORRECTION

PATENT NO. : 7,496,905 B2 Page 1 of 1
APPLICATION NO. : 10/893423
DATED : February 24, 2009
INVENTOR(S) : Zatloukal et al.

It is certified that error appears in the above-identified patent and that said Letters Patent is hereby corrected as shown below:

In column 9, line 49, in claim 12, delete "branch multi-way" and insert -- multi-way branch --, therefor.

Signed and Sealed this

Eighteenth Day of May, 2010

David J. Kappos
*Director of the United States Patent and Trademark Office*